US012191597B2

(12) United States Patent
Urtz, Jr. et al.

(10) Patent No.: US 12,191,597 B2
(45) Date of Patent: Jan. 7, 2025

(54) RADIO FREQUENCY (RF) CONNECTOR HAVING INTEGRATED WEATHER PROTECTION SYSTEM (WPS)

(71) Applicant: John Mezzalingua Associates, LLC, Liverpool, NY (US)

(72) Inventors: Thomas Sawyer Urtz, Jr., North Syracuse, NY (US); Brandon M. Stevens, Liverpool, NY (US); Jeremy Charles Benn, Baldwinsville, NY (US); Christopher P. Natoli, Baldwinsville, NY (US); Jeffrey P. Dennis, Liverpool, NY (US)

(73) Assignee: John Mezzalingua Associates, LLC, Liverpool, NY (US)

( * ) Notice: Subject to any disclaimer, the term of this patent is extended or adjusted under 35 U.S.C. 154(b) by 563 days.

(21) Appl. No.: 17/434,050

(22) PCT Filed: Mar. 5, 2020

(86) PCT No.: PCT/US2020/021126

§ 371 (c)(1),
(2) Date: Aug. 26, 2021

(87) PCT Pub. No.: WO2020/181054

PCT Pub. Date: Sep. 10, 2020

(65) Prior Publication Data

US 2022/0140521 A1 May 5, 2022

Related U.S. Application Data

(60) Provisional application No. 62/814,031, filed on Mar. 5, 2019.

(51) Int. Cl.
*H01R 13/52* (2006.01)
*H01R 9/05* (2006.01)
(Continued)

(52) U.S. Cl.
CPC ........... *H01R 13/5205* (2013.01); *H01R 9/05* (2013.01); *H01R 13/502* (2013.01);
(Continued)

(58) Field of Classification Search
CPC .... H01R 13/5205; H01R 9/05; H01R 13/502; H01R 13/5219; H01R 24/564; H01R 13/631; H01R 13/5202; H01R 2103/00
See application file for complete search history.

(56) References Cited

U.S. PATENT DOCUMENTS 8,366,481 B2 * 2/2013 Ehret .................. H01R 9/0521 439/578
9,270,046 B2 * 2/2016 Natoli .................... H01R 13/52
(Continued)

FOREIGN PATENT DOCUMENTS

DE 4439852 A1 * 5/1996 ......... H01R 13/6277
EP 1953875 A1 8/2008

OTHER PUBLICATIONS

European Patent Office; Extended European Search Report; Application No. 20767318.7; Patent No. 3935696; Date of Completion: Oct. 21, 2022; 12 pages.
(Continued)

*Primary Examiner* — Peter G Leigh
*Assistant Examiner* — Nader J Alhawamdeh
(74) *Attorney, Agent, or Firm* — Barclay Damon LLP

(57) ABSTRACT

An RF connector having an integral weather protection system for protecting the connector from water, ice, salt, debris and other foreign damage. The connector comprises a Weather Protection (WP) assembly circumscribing a connector body, which, in turn, sealably mounts to a coaxial cable. The WP assembly comprises a housing, a compliant sealing ring and a biasing element. The WP housing sealably mounts over an end of the connector body and defines an
(Continued)

aperture at an opposite end thereof to receive the coaxial cable and facilitate axial translation of the housing relative to the connector body. The compliant sealing ring has an inwardly facing sealing surface which defines a diameter dimension. And, the biasing element is reconfigurable from an expanded to a collapsed state in response to axial displacement of the housing relative to the connector body. Operationally, the biasing element engages the compliant ring to expand the diameter dimension of the biasing element around a portion an interface port, and closes over a sealing surface of the interface port to seal the compliant ring against the sealing surface.

18 Claims, 7 Drawing Sheets

(51) Int. Cl.
*H01R 13/502* (2006.01)
*H01R 24/56* (2011.01)
*H01R 13/631* (2006.01)

(52) U.S. Cl.
CPC ....... *H01R 13/5219* (2013.01); *H01R 24/564* (2013.01); *H01R 13/631* (2013.01)

(56) References Cited

U.S. PATENT DOCUMENTS 9,716,345 B2 7/2017 Watkins
10,122,131 B2 * 11/2018 Stevens .................. H01R 24/40
2008/0311789 A1 12/2008 Burris et al.
2012/0252263 A1 * 10/2012 Ehret .................. H01R 9/0521 439/578
2013/0115813 A1 * 5/2013 Ehret ................. H01R 13/5025 29/874
2014/0045356 A1 * 2/2014 Natoli .................... H01R 13/52 439/272
2016/0149320 A1 5/2016 Anderson et al.
2016/0336676 A1 * 11/2016 Stevens .............. H01R 13/6583
2018/0226757 A1 * 8/2018 Urtz, Jr. ................. H01R 24/42
2018/0233865 A1 8/2018 Eriksen
2021/0119381 A1 * 4/2021 Urtz ..................... H01R 13/641
2022/0140521 A1 * 5/2022 Urtz, Jr. ............. H01R 13/5219 439/271
2022/0247100 A1 * 8/2022 Benn .................... H01R 9/0524

OTHER PUBLICATIONS

International Searching Authority, International Search Report and Written Opinion, Date of mailing: Jun. 29, 2020, 12 pages.
International Preliminary Report on Patentability, Report Dated: May 28, 2021, 4 pages.
Canadian Intellectual Property Office; Application No. 3,132,373; Dated: Dec. 5, 2023; 6 pages.
Canadian Intellectual Property Office; Application No. 3,132,373; Dated: Oct. 8, 2024; 4 pages.
Australian Patent Office; Application No. 2020232762; Dated: Sep. 18, 2024; 3 pages.
European Patent Office; First Office Action; Application No. 20 767 318.7; Dated: Nov. 11, 2024; 8 pages.

* cited by examiner

Fig. 7
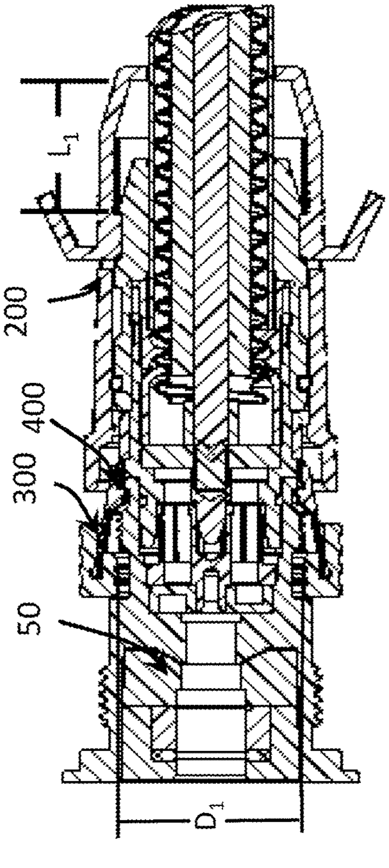
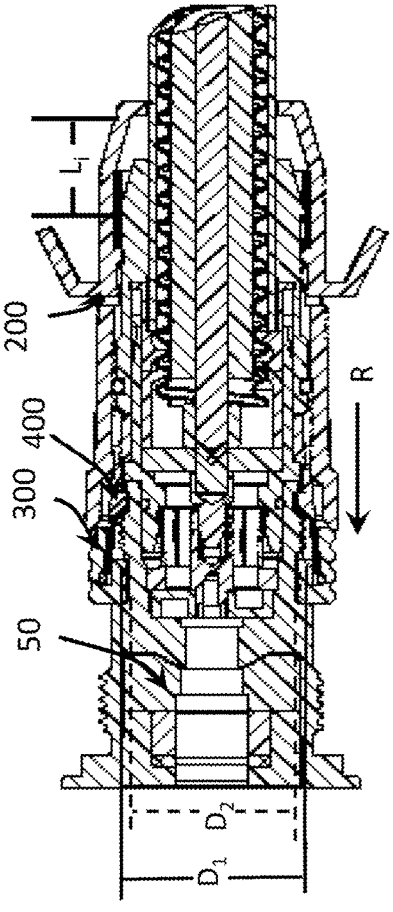
Fig. 8
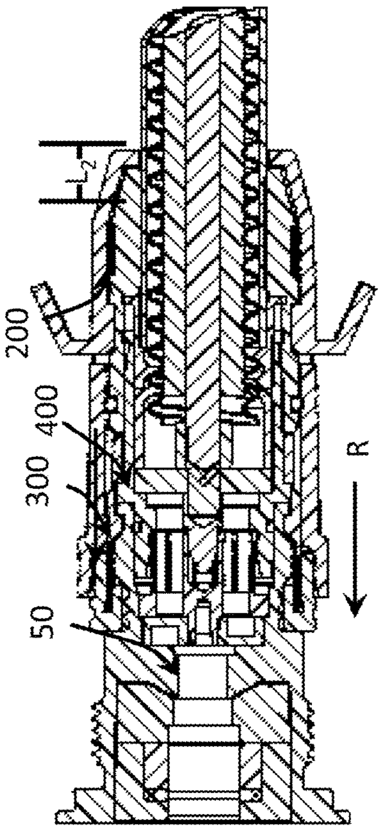
Fig. 9

RADIO FREQUENCY (RF) CONNECTOR HAVING INTEGRATED WEATHER PROTECTION SYSTEM (WPS)

TECHNICAL FIELD

This disclosure relates to Radio Frequency (RF) Connectors and, more particularly, to a new and useful RF connector having an integral Weather Protection System (WPS) performing a variety of functions, including: (i) sealing, (ii) opening & closure, and (iii) reducing Passive Intermodulation (PIM) interference.

BACKGROUND

Coaxial cables are typically connected to interface ports, or corresponding connectors, for the operation of various electronic devices, such as mobile phones, telecommunications equipment, remote radio units, base stations, etc. Typically, such coaxial cables are installed in harsh outdoor environments which subject the cable/connectors to rain, snow, ice, wind and other elements. To protect the cable/connectors from the elements, a variety of weatherproofing systems have been devised providing critical protection for connectors installed in combination with such cellular antennas/towers. Initially, weather proofing methods included the use of a fluid butyl sealant in combination with mastic tape disposed about the coaxial cable/connectors. While such methods provide excellent sealing, they are typically difficult to manipulate and messy to clean-up. Other, more sophisticated Weather Protection Systems (WPS) include a soft silicone boot/sleeve which cover and protect most, or all, of the cable connection. That is, a large boot slides over the connection to produce a seal on both sides of the connection. Unfortunately, such boots/WPS equipment can be prohibitive for certain applications, i.e., from a size and cost perspective.

It will be appreciated that most cable connectors/interface ports present a variety of irregular surfaces, e.g., a threaded surface, polygonal surfaces (defining a hex-shaped exterior configuration), a plurality of steps, etc., which can be difficult to protect due to problems associated with producing a reliable seal over such irregular surfaces. As such, environmental elements often penetrate the cable connections causing problems with cellular communications. Additionally, over-time, the RF connector can loosen, allowing vibration to degrade, or otherwise exacerbate, the efficacy of the RF connection. As such, passive intermodulation interference, i.e., PIM interference, can develop, resulting in poor signal transmission/reception.

Another difficulty associated with conventional WPS devices relates to the inability to slide the elastomeric boot over connectors which vary in size. That is, an operator must typically carry a plurality of boots which vary in diameter dimension, i.e., the inner mold line (IML) dimension, to allow the boot to slide onto, and/or off of, the electrical connector. The diameter dimension thereof may vary only slightly from one connector to another which causes the build-up or suction of air as the operator attempts to slide the rubber boot over the body of the connector. Should an operator forcibly install such an elastomeric boot, sealing surfaces can become misaligned which may lead to weather-induced degradation of the connector. It will be appreciated that such degradation leads to increased replacement costs, i.e., the time associated with: (i) travel to and from a remotely-located tower, (ii) climbing up and down an antenna tower, and (iii) removal and reassembly of a connector assembly.

Accordingly, there is a need to overcome, or otherwise lessen the effects of, the disadvantages and shortcomings described above.

SUMMARY

An RF connector is provided having an integral weather protection system for protecting the connector from water, ice, salt, debris and other foreign damage. The connector comprises a Weather Protection (WP) assembly circumscribing a connector body, which, in turn, sealably mounts to a coaxial cable. The WP assembly comprises a housing, a compliant sealing ring and a biasing element. The housing sealably mounts over an end of the connector body and defines an aperture at an opposite end thereof to receive the coaxial cable and facilitate axial translation of the housing relative to the connector body. The compliant sealing ring has an inwardly facing sealing surface which defines a diameter dimension. And, the biasing element is reconfigurable from an expanded to a collapsed state in response to axial displacement of the housing relative to the connector body. Operationally, the biasing element engages the compliant ring to expand the diameter dimension of the biasing element around a portion an interface port, and closes over a sealing surface of the interface port to seal the compliant ring against the sealing surface.

BRIEF DESCRIPTION OF THE DRAWINGS

Additional features and advantages of the present disclosure are described in, and will be apparent from, the following Brief Description of the Drawings and Detailed Description.

FIG. 7 is a cross-sectional view of the weather protection assembly along the diameter of the RF connector wherein a first end of the biasing element engages the compliant sealing ring and expands the diameter dimension of the compliant sealing ring to stretch the ring over a shoulder of the interface port.

FIG. 8 is a cross-sectional view of the weather protection assembly along the diameter of the RF connector wherein the housing is forwardly displaced axially toward the interface port to engage and collapse the first end of the biasing element such that the compliant sealing ring is mechanically coupled over the interface port to sealably engage a sealing surface of the interface port.

FIG. 9 is a cross-sectional view of the weather protection assembly along the diameter of the RF connector wherein the housing is fully-displaced toward the interface port to seal the annular ring of the housing to a second surface of the compliant sealing ring.

DETAILED DESCRIPTION

A Radio Frequency (RF) connector is described for providing water, wind, ice, sand and foreign object damage protection. More specifically, the RF connector includes an integral weather protection assembly which expands and contracts to open/envelope/collapse about a sealing surface of an interface port. As described in the Background of the Invention, Weather Protecting RF connectors are typically employed outdoors, i.e., for connections made on cellular communications towers, between jumper cables, telecommunications antennas, and/or in combination with a coaxial cable.

Figure 1:
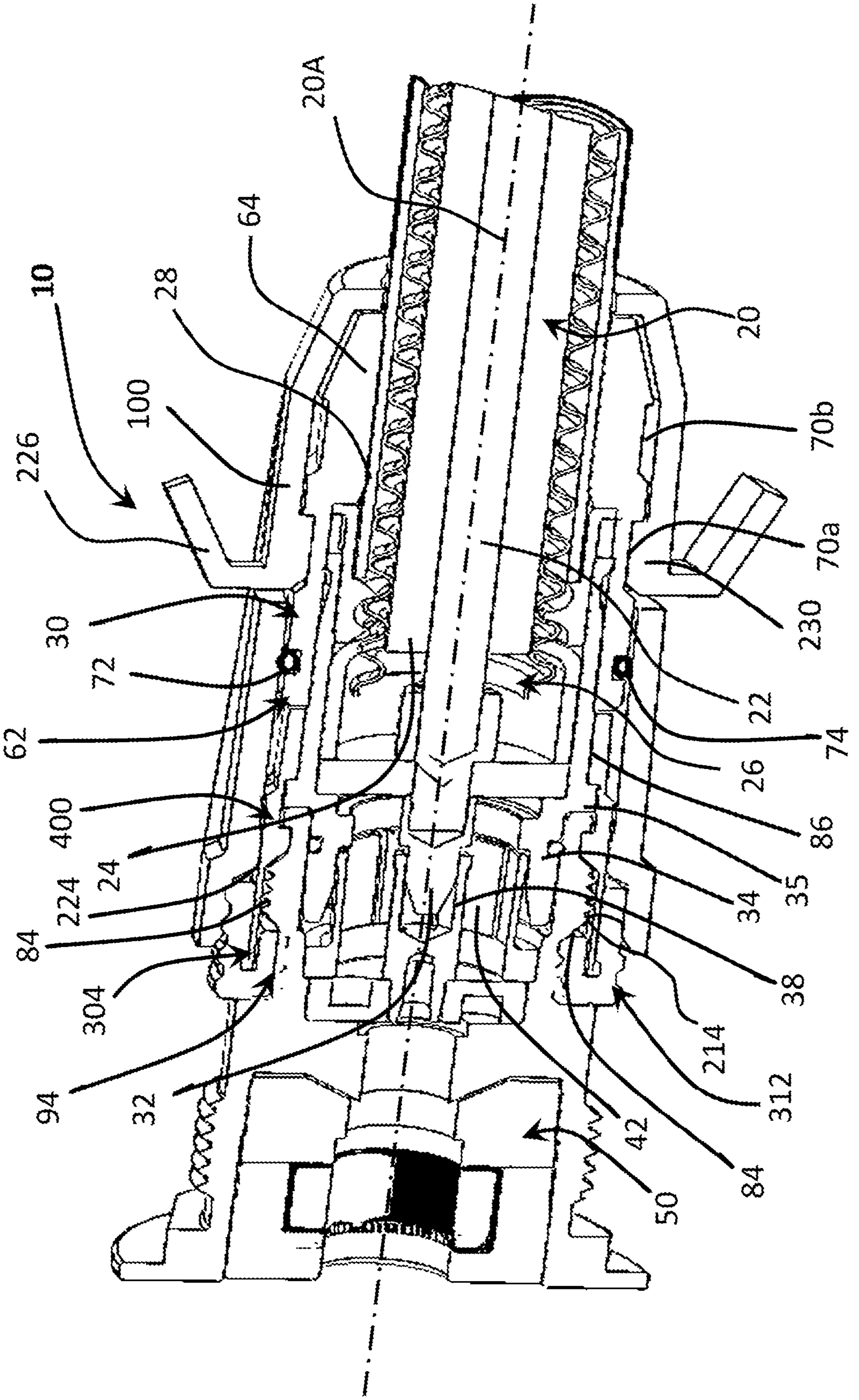
FIG. 1 is a cross-sectional view of a Radio Frequency (RF) connector having an integral weather protection assembly, which connector is disposed in combination with a prepared end of a coaxial cable and configured for being mechanically and electrically connected to an RF interface port.

In FIG. 1, an RF connector 10 is disposed in combination with a coaxial cable 20. A typical coaxial cable 20 may include: (a) a conductive pin, central wire, tube, strand or inner conductor 22; (b) a cylindrical or tubular dielectric core, or insulator 24 that receives and surrounds the inner conductor 22; (c) a conductive, sleeve, tube, or outer conductor 26 that receives and surrounds the dielectric core or insulator 24; and (d) a sheath or outer jacket 28 that receives and surrounds the outer conductor 26. The outer conductor 26 may be corrugated, i.e., defining a plurality of peaks and valleys, to facilitate flexing or bending of the cable relative to an elongate axis 20A.

The RF connector 10 includes a connector body 30 disposed over, and mechanically connecting to, a prepared end of a coaxial cable 20. In the context used herein, "a prepared end" means a coaxial cable 20 which has been cut, spliced and stripped such that the conductive pin 22 extends beyond or past the dielectric core 24 while outer conductor 26 extends beyond or past the sheath or outer jacket 28. While the coaxial cable 20 may be prepared by simply stripping or folding back non-conductive elements such as the dielectric core 24 or an elastomeric sheath or jacket 28, many RF connectors will be prepared by the addition of an extension pin 32 and/or the inclusion of a conductive post 34. That is, an extension pin 32 may be disposed in combination with the central pin 22 while a conductive post 34 may be disposed in combination with the outer conductor 26. In the described embodiment, the conductive post 34 includes a radially protruding flange 35 useful for mechanically connecting the connector 10 to the interface port 50. The function of the flange 35 will become evident when discussing the weather protection assembly in greater detail below.

The RF connector 10 transmits and/or receives RF signals to an interface port 50 which, in turn, conveys the signals to any one of a variety of RF devices, e.g., a telecommunication antenna, remote unit, jumper cable, GPS, etc. The extension pin 32 may be received by a conductive socket 38 of the interface port 50 whereas the post 34 may mate with a plurality of outwardly biased fingers of a conductive basket 42. Both the socket 38 and basket 42 produce friction interfaces for conveying electrical signals (via the socket 38) and providing an electrical shield (via the basket 42) across the RF connector 10.

Figure 2:
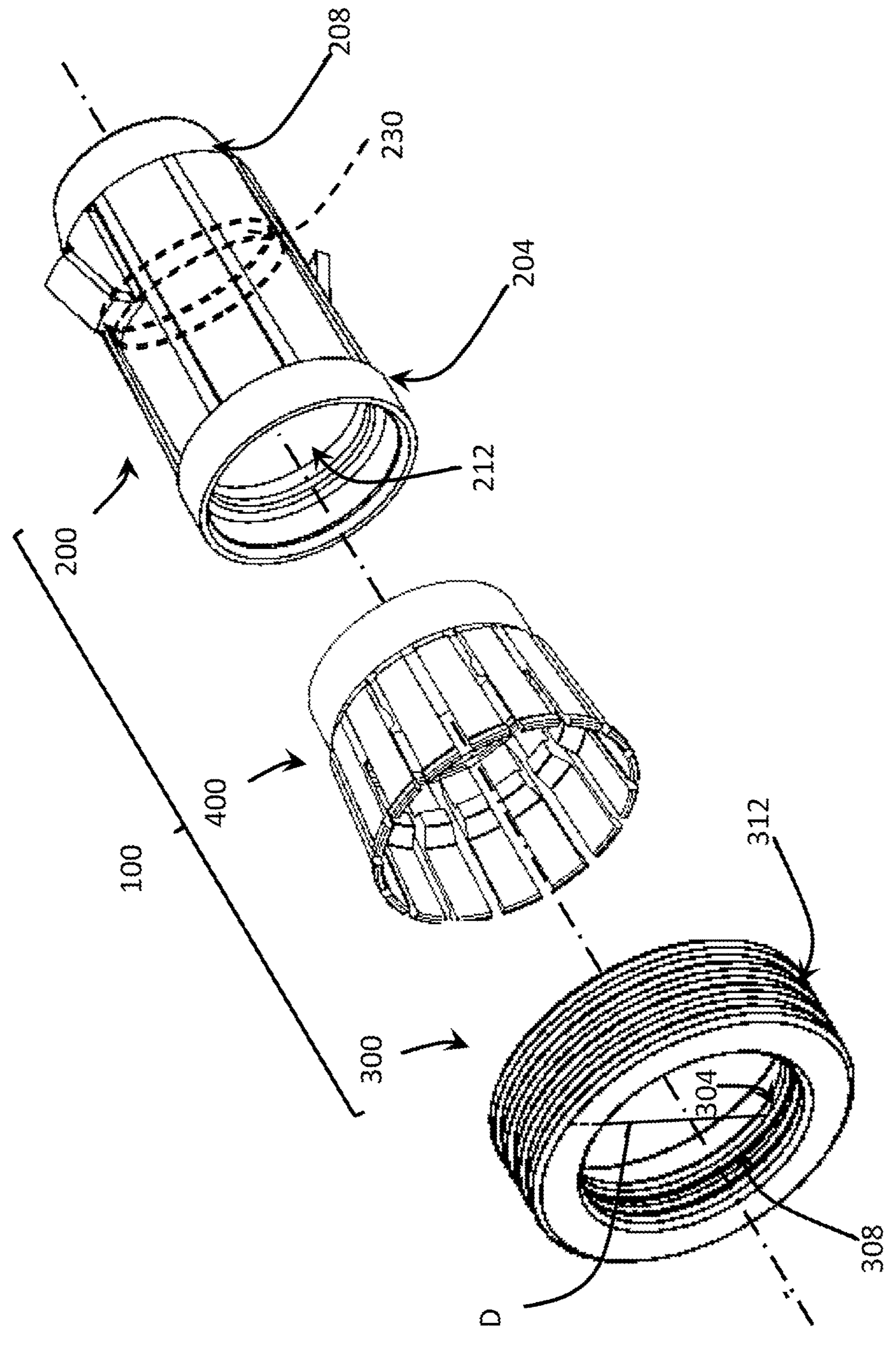
FIG. 2 is an exploded perspective view of the weather protection assembly depicted in FIG. 1 including an housing, a compliant sealing ring, and a biasing element connecting the housing to the compliant sealing ring.

In FIGS. 1 and 2, the RF connector 10 comprises a connector body 30 and a weather protection assembly 100 configured to environmentally seal mechanically couple, and electrically shield, the mating interfaces between the RF connector 10 and the interface port 50. More specifically, weather protection assembly 100 is configured to expand and contract to produce an environmental seal over the RF connector 10. Additionally, a mechanical interlock is formed as the weather protection assembly expands and contracts to facilitate assembly and disassembly of the connector 10. That is, the weather protection assembly 100 closes over/releases one or more locking shoulders formed along an external surface of the interface port 50. Finally, an electrical shield is produced to reduce or mitigate Passive InterModulation (PIM) interference as the weather protection assembly 100 closes over the interface port 50. These benefits will be understood and appreciated in view of the following detailed description.

The connector body 30 includes a central bore for receiving the prepared end of the coaxial cable 20 and includes a forward end 62 and an aft end 64. The forward end 62 is secured to the conductive post 34 while the aft end 64 frictionally engages the jacket 28 of the coaxial cable 20, i.e., to maintain the relative position of the connector body 30 and the cable 20. Furthermore, the connector body 30 defines first and second axially-spaced grooves 70*a*, 70*b* for receiving an inwardly facing annular protrusion or ridge 230 formed upon or over an internal face surface of the weather protection assembly 100. The first and second axially-spaced grooves 70*a*, 70*b* formed in the connector body 30 function to retain the relative axial position of the weather protection assembly 100 with respect to the connector body 30. Finally, a third groove 72 receives a compliant O-ring 74 to form a watertight seal between an internal surface of the weather protection assembly 100 and the connector body 30. Consequently, ingress of water, debris and other fluids into the body is inhibited.

The connector body 30 may be constructed from materials having suitable strength, stiffness and mechanical properties. Such materials may include a conductive steel, aluminum, or a non-conductive thermoplastic, thermoset, or polyvinyl-chloride (PVC) material.

Figure 3:
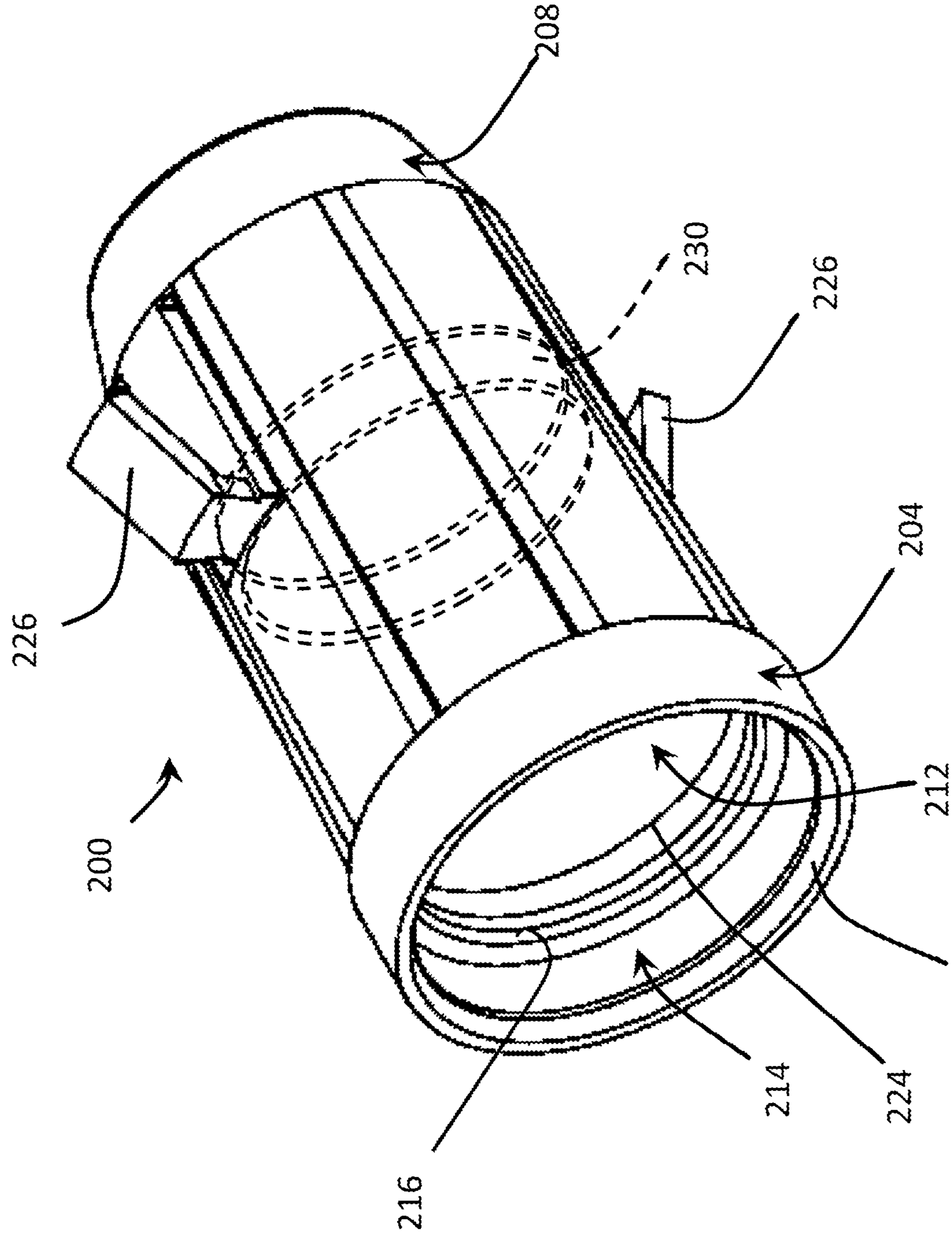
FIG. 3 is an isolated perspective view of the housing depicted in FIG. 2.
Figure 4:
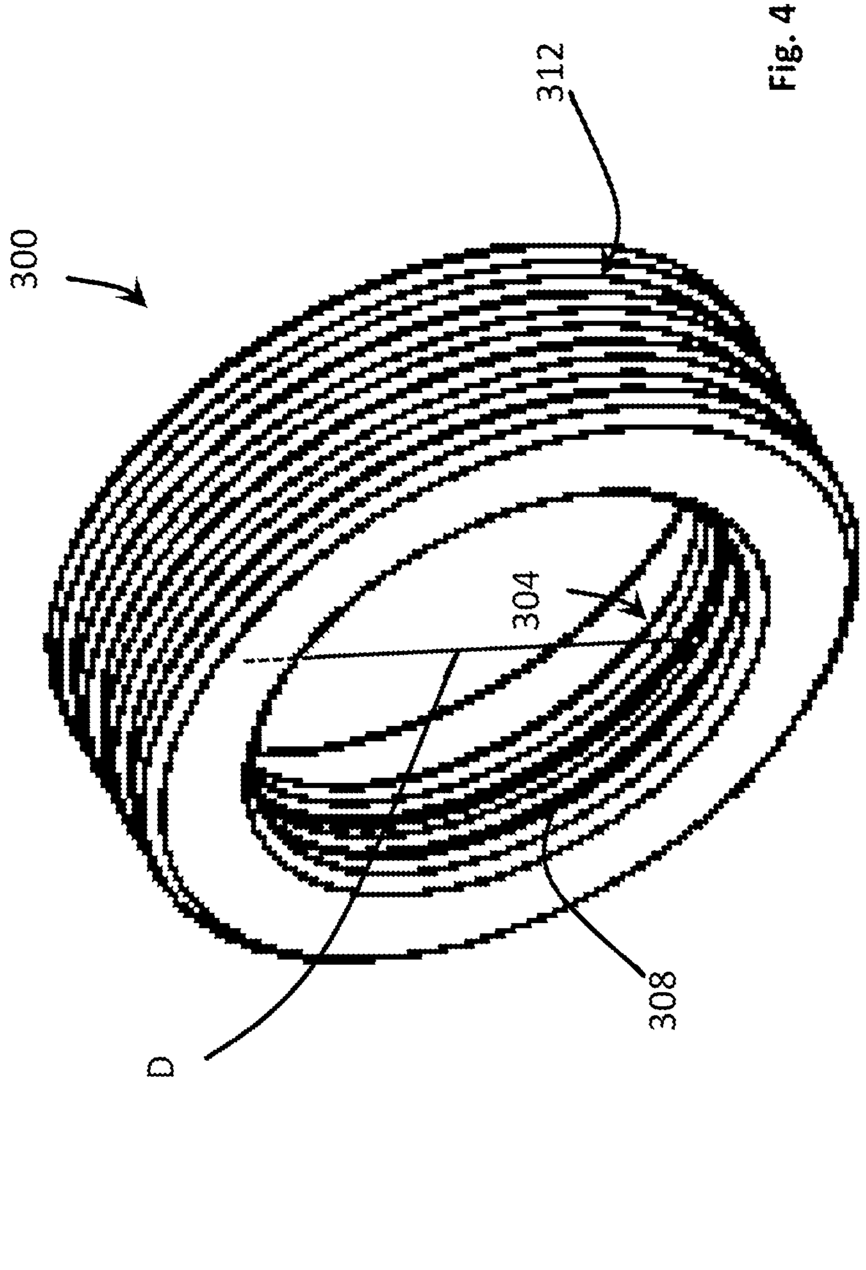
FIG. 4 is an isolated perspective view of the compliant sealing ring depicted in FIG. 2.

In FIGS. 2-5, the weather protection assembly 100 comprises: a Weather Protection (WP) housing 200, a compliant sealing ring 300, and a biasing element 400. In FIGS. 2 and 3, the WP housing 200 includes first and second ends 204, 208 defining a central bore 212 for receiving the coaxial cable 20. As will be understood from a description of its function, the central bore 212 also facilitates axial translation of the WP housing 200 along the axis 20A of the coaxial cable 20.

The first end 204 of the WP housing 200 defines an internal surface 214 having one or more ridges, corrugations or threads 216 configured to engage an external sealing surface 312 of the compliant sealing ring 300. Additionally, the first end 204 also defines an inclined surface abutment surface 222 configured to engage an edge of the compliant sealing ring 300 to allow the first end 204 to ride up and over an outwardly facing surface of the compliant sealing ring 300. Furthermore, the first end of the WP housing 200 defines a sliding abutment ridge or edge 224 which functions to displace an outwardly facing external surface 402 of the biasing element 400 inwardly. As will be discussed when describing the compliant sealing ring 300 and biasing element 400 in greater detail, the internal surface 214 of the WP housing 200 effects a seal between the compliant sealing ring 300 and the interface port 50 while the edge 224 of the WP housing 200 urges the biasing element 400 inwardly to effect a mechanical interlock with the outwardly protruding shoulder 35 formed in combination with the post 34 of the RF connector 10

The bore 212 extends through the WP housing 200 from the first to the second ends 204, 208, though the internal diameter varies due to requisite changes in the internal geometry. For example, the internal diameter is largest at the forward end of the WP housing 200 to accommodate the thickness dimension of the compliant sealing ring 300, i.e., one fully assembled. Additionally, the internal diameter is minimum at the second end 208 to accommodate a ridge or flange 230 projecting inwardly from the internal surface of the bore 212. The ridge or flange 230 engages one of the two axially spaced grooves 70*a*, 70*b* molded or machined into the external surface of the connector body 30. As previously mentioned, the first and second axially-spaced grooves 70*a*, 70*b* function to retain the relative axial position of the WP housing 200 with respect to the connector body 30.

The compliant sealing ring 300 defines an annular cavity 304 and a sealing surface 308 having a diameter dimension D. The compliant sealing ring is highly elastic, allowing the diameter dimension D to vary by as much as thirty to forty percent (30%-40%). These geometric variations are required to enable the sealing surface 308 to stretch over a radially projecting ridge or shoulder 84 of the interface port 50 as the weather protection assembly 100 closes over, locks and seals the RF connector to the interface port 50. In the described embodiment, the shoulder 84 is formed by a plurality of raise ridges or threads, however, it will be appreciated that a right-angled shoulder may be substituted therefor.

To accommodate the requisite dimensional changes, the compliant sealing ring 300 is fabricated from a high elongation material such as a low durometer elastomer. Accordingly, the material of the compliant sealing ring 300 is preferably an elastomeric material having elongation properties which exceed about three-hundred percent (300%) to about five-hundred percent (500%) of its original dimension. Alternatively, or additionally, the material may have a Shore-A hardness which is less than about seventy (70) and, more preferably, less than about fifty (50.)

The biasing element 400 is disposed between, and connects, the weather protection WP housing 200 and the compliant sealing ring 300. A first or aft end 404 of the biasing element 400 faces the connector body 30 of the RF connector 10, while a second or aft end 408 faces the interface port 50. The aft end 404 comprises an annular ring 410 disposed within an annular groove 86 formed between the radially projecting shoulder 35 and a forward edge 90 of the connector body 30. The forward end 408 of the biasing element 400 comprises a plurality of spring fingers 412 each having a tip end 414 disposed within the annular cavity 304 of the biasing element 300. In the described embodiment, the biasing element 300 comprises as many as seventeen, equally-spaced, spring fingers 412 wherein pairs of such fingers 412 are separated by an elongate slot 413.

The biasing element 400 may be fabricated from any material having an ability to maintain a sufficient spring stiffness to stretch the compliant sealing ring 300 to a larger diameter dimension than an unstrained sealing ring. Furthermore, the spring fingers 402 of the biasing element 400 should have an ability to stretch the compliant sealing ring 300 over whatever radial obstacle, protrusion or ridge, e.g., such as ridge 84, may be formed along the edge of the interface port 50. Generally, a metal or ferromagnetic material may be best suited for producing the requisite biasing characteristics, however, a thermoset or thermoplastic material may also be suitable. While the conductive basket 42 provides a degree of RF shielding, it will be appreciated that a second conductive structure, i.e., the biasing element 400, may be configured to augment RF shielding to reduce PIM interference. Accordingly, a ferromagnetic or conductive metal such as stainless steel may be preferable to augment the RF shielding properties of the RF connector 10.

Figure 6:
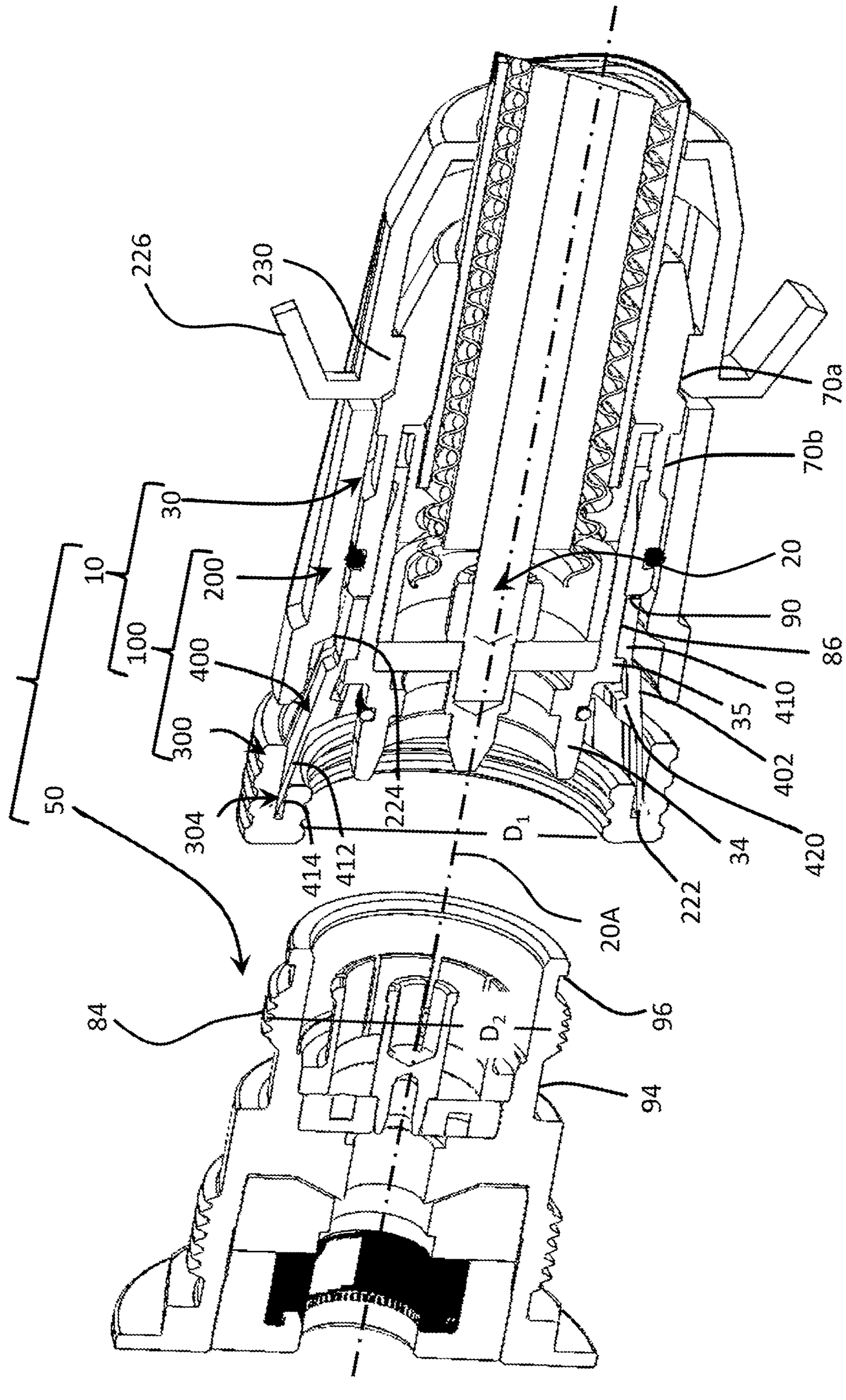
FIG. 6 is an exploded sectional view of the Radio Frequency (RF) connector disposed in combination with the coaxial cable, the integral weather protection assembly disposed over and circumscribing a body portion of the connector, and an interface port for being mechanically and electrically connected to the RF connector.

Initially, and referring to FIGS. 6 and 7, each of the tip ends 414 of the spring fingers 412 collectively produce a diameter which is larger than the unstrained diameter dimension of the compliant sealing ring 300. Accordingly, when the tip ends 414 of the spring fingers 412 engage the annular cavity 305, the diameter dimension is stretched or expanded outwardly to a larger diameter than that of an unstrained compliant sealing ring 300. As such, the diameter $D_1$ is oversized relative to the diameter $D_2$, a threshold diameter established or predetermined by the radially protruding ridge 84 of the interface port 50. Consequently, in a first axial position $L_1$, the inwardly facing annular protrusion 230 of the connector body 30 is disposed within the axial recess 70*a* while the compliant sealing ring 300 is stretched to a diameter $D_1$ which is larger than diameter $D_2$ defined by the annular ridge 84. In FIG. 6, the RF connector 10 has not, as yet, been displaced over the radially protruding ridge 84 of the interface port 50. In FIG. 7, however, the RF connector 10 and the interface port 50 have been moved relative to each other such that the compliant sealing surface 308 of the compliant ring 300 is displaced over the radially protruding shoulder or ridge 84 such that it aligns axially with a sealing surface 94 adjacent, and axially inboard of, the ridge 84.

Figure 5:
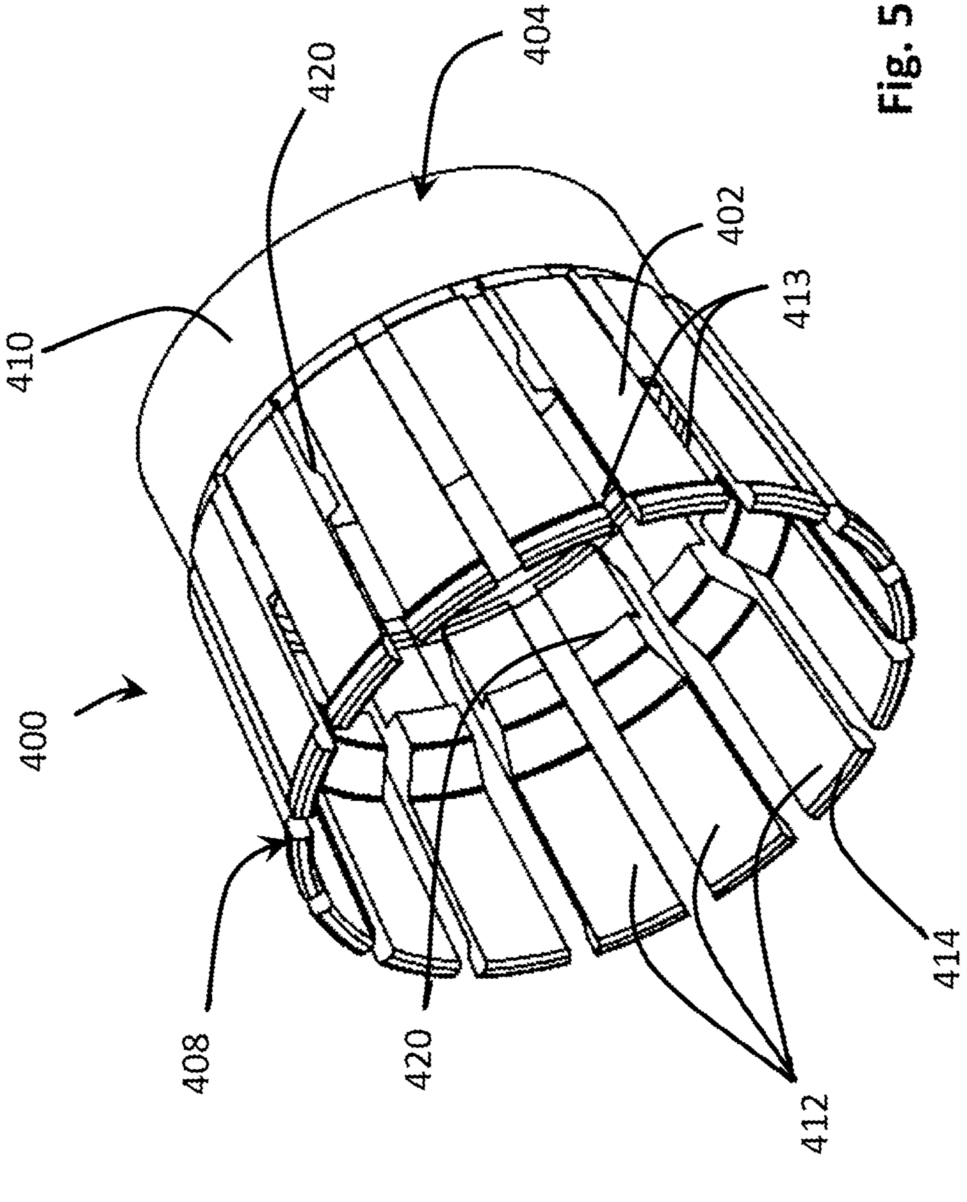
FIG. 5 is an isolated perspective view of the biasing element depicted in FIG. 2.

In FIGS. 5, 6 and 8, the biasing element 400 collapses in response to the axial motion of the housing 200 wherein the inclined edge 224 of the WP housing 200 engages the backside or outwardly facing surfaces 402 of each spring finger 412. That is, as the WP housing 200 is axially displaced, i.e., in the direction of arrow R, from the first position $L_1$ (in FIG. 7) to an intermediate position $L_i$ (in FIG. 8), the inclined edge 224 of the WP housing urges the spring fingers 412 inwardly such that the sealing surface 308 of the sealing ring 300 engages the interface port 50, i.e., against the surface 94 inboard of, and adjacent to, the ridge 84.

In FIGS. 5, 6 and 9, the WP housing 200 moves from the intermediate position $L_i$ to a second position $L_2$ wherein the spring fingers 412 are fully collapsed by the WP housing 200. Furthermore, in this position, the annular ring 212 of the housing 200 compresses the biasing element 300 against the sealing surface 94 of the interface port 50. Additionally, a locking shoulder 420 formed on the inwardly facing surface of each spring finger 412 engages a locking shoulder 96 disposed at a tip end of the interface port 50. Consequently, in the second axial position $L_2$, the inwardly facing annular protrusion 230 of the connector body 30 is disposed within the second axial recess 70*b* to retain the axial position of the biasing element 400. To release the biasing element 400, the wing tabs 226 extending outwardly, along the opposite side of the WP housing 400, may be pulled outwardly or apart.

In summary, the RF connector and integral weather protection system performs multiple functions. Specifically, the weather protection assembly 100 expands and contracts to facilitate assembly and disassembly of the connector 10. That is, a mechanical interlock forms as the weather protection assembly 100 closes over/releases one or more locking shoulders formed along an external surface of the interface port 50. Additionally, the conductive biasing member 400 provides an electrical shield to reduce or mitigate Passive InterModulation (PIM) interference as the weather protection assembly 100 closes over the interface port 50. Finally, an environmental seal forms as the weather protection assembly 100 expands and contracts over one or more external surfaces of the interface port 50.

Additional embodiments include any one of the embodiments described above, where one or more of its components, functionalities or structures is interchanged with, replaced by or augmented by one or more of the components, functionalities or structures of a different embodiment described above.

It should be understood that various changes and modifications to the embodiments described herein will be apparent to those skilled in the art. Such changes and modifications can be made without departing from the spirit and scope of the present disclosure and without diminishing its intended advantages. It is therefore intended that such changes and modifications be covered by the appended claims.

Although several embodiments of the disclosure have been disclosed in the foregoing specification, it is understood by those skilled in the art that many modifications and other embodiments of the disclosure will come to mind to which the disclosure pertains, having the benefit of the teaching presented in the foregoing description and associated drawings. It is thus understood that the disclosure is not limited to the specific embodiments disclosed herein above, and that many modifications and other embodiments are intended to be included within the scope of the appended claims. Moreover, although specific terms are employed herein, as well as in the claims which follow, they are used only in a generic and descriptive sense, and not for the purposes of limiting the present disclosure, nor the claims which follow.

The invention claimed is:

1. A connector having an integral weather protection system, comprising:

a Weather Protection (WP) assembly circumscribing a connector body, the connector body sealably mounting to a coaxial cable, the WP assembly comprising:

a housing sealably mounted over an end of the connector body and defining an aperture at the opposite end to receive the coaxial cable, the aperture facilitating axial translation of the housing relative to the connector body;

a compliant ring having an inwardly facing sealing surface, the inwardly facing sealing surface defining a diameter dimension; and a biasing element including a forward end and an opposing aft end and positioned between the housing and the compliant ring, the forward end of the biasing element is configured to face the connector body and the aft end comprises a plurality of spring fingers, wherein the plurality of spring fingers are reconfigurable from an expanded state to a collapsed state in response to axial displacement of the housing relative to the connector body;

wherein in the expanded state, the biasing element engages with the compliant ring to stretch the compliant ring to expand the diameter dimension of the compliant ring around a portion an interface port; and wherein in the collapsed state, the biasing element engages with the compliant ring and urges the biasing element radially inward to reduce the diameter dimension of the compliant ring to seal the compliant ring against the sealing surface.

2. The connector of claim 1, wherein the compliant ring has an outwardly facing sealing surface; and wherein the housing has an annular sealing surface at one end thereof sealably mounting to the outwardly facing sealing surface in response to the axial displacement of the housing relative to the connector body.

3. The connector of claim 1, wherein an inwardly facing surface of the housing includes an engagement surface configured to urge the biasing element inwardly to reduce the diameter dimension of the compliant ring to close the biasing element over the sealing surface of the interface port.

4. The connector of claim 1, wherein the interface port includes a radially projecting surface at a tip end of the interface port;

wherein the sealing surface is disposed axially inboard of the tip end; and wherein the biasing element is disposed over the radially projecting surface to engage the sealing surface of the interface port.

5. The connector of claim 1, wherein the compliant ring includes an annular cavity disposed between the inwardly and outwardly facing sealing surfaces; and wherein the biasing element includes a plurality of spring-fingers having one end engaging the annular cavity of the compliant ring to expand the diameter dimension over a sealing surface of the interface port.

6. The connector of claim 1, wherein the connector body defines at least one circumferential groove formed in an outwardly facing peripheral surface thereof; and wherein the housing includes at least one radially projecting protrusion slideably engaging the outwardly facing peripheral surface and engaging the groove to maintain the position of the housing relative to the connector body.

7. The connector of claim 6, wherein the housing includes at least one radially projecting tab disposed oppositely the at least one radially projecting protrusion; and wherein the radially projecting tab is pulled radially outboard to release the radially projecting protrusion from the at least one circumferential groove.

8. The connector of claim 1, wherein each spring-finger includes an inwardly projecting flange for engaging an outwardly projecting annular protrusion formed in the interface port to secure the connector body to the interface port.

9. The connector of claim 1, wherein the biasing element includes a ring-shaped sleeve for collectively mounting each of the spring fingers; and wherein the ring-shaped sleeve mounts between a radially projecting flange of a post and the end of the connector body facing the interface port.

10. A connector having an integral weather protection system, comprising:

a connector body disposed over a prepared end of a coaxial cable and defining at least one circumferential groove formed in an outwardly facing peripheral surface of the connector body, and a weather protection assembly circumscribing the connector body and comprising:

a housing defining a bore for receiving the coaxial cable and facilitating axial translation of the housing, an inwardly projecting flange slidably engaging a peripheral surface of the connector body and being received within the at least one circumferential groove to retain an axial position of the housing relative to the connector body, and an inclined engagement surface;

a compliant ring having an annular cavity, an inwardly facing sealing surface defining a diameter dimension and an outwardly facing sealing surface; and, a biasing element connecting the housing to the compliant ring and including a forward end and an opposing aft end and positioned between the housing and the compliant ring, wherein the forward end of the biasing element is configured to face the connector body and the aft end comprises a plurality of spring fingers configured to move from an expanded position to a collapsed position;

wherein, in the expanded position, the biasing element engages with and stretches the compliant ring to expand the diameter dimension thereof around a radially projecting ridge of an interface port; and wherein, in the collapsed position, the biasing element engages with the compliant ring and urges the biasing element radially inwardly in response to axial motion of the housing to collapse the compliant ring inwardly and reduce the diameter dimension of the compliant ring to seal the inwardly facing surface of the compliant ring against a surface adjacent to the radially projecting ridge of the interface port.

11. The connector of claim 10, wherein the biasing element further comprises a plurality of spring fingers separated by a plurality of elongate slots;

wherein the interface port includes at least one annular groove producing an outwardly facing recess formed at a tip end portion of the interface port; and wherein each spring finger includes an inwardly projecting protrusion to interlock with the at least one annular groove to connect the connector body to the interface port when causing the compliant ring to seal against a sealing surface of the interface port.

12. A connector having an integral weather protection system, comprising:

a connector body disposed over a prepared end of a coaxial cable and defining at least one circumferential groove formed in an outwardly facing peripheral surface of the connector body, and a weather protection assembly circumscribing the connector body and comprising:

a housing defining a bore for receiving the coaxial cable and facilitating axial translation of the housing, an inwardly projecting flange slidably engaging a peripheral surface of the connector body and being received within the at least one circumferential groove to retain the axial position of the housing relative to the connector body, and an inclined engagement surface;

a compliant ring having an annular cavity, an inwardly facing sealing surface defining a diameter dimension and an outwardly facing sealing surface; and a biasing element connecting the housing to the compliant ring and configured to move from an expanded position to a collapsed position, wherein, in the expanded position, the biasing element stretches the compliant ring and expands the diameter dimension thereof around a radially projecting ridge of an interface port, wherein, in the collapsed position, the biasing element is urged radially inwardly in response to axial motion of the housing, collapse the compliant sealing ring inwardly, and reduce the diameter dimension thereof to seal the inwardly facing surface of the compliant ring against a surface adjacent the radially projecting ridge of the interface port, wherein the compliant ring has an outwardly facing sealing surface, and wherein the housing has an annular sealing surface at one end thereof sealably mounting to the outwardly facing sealing surface in response to axial displacement of the housing relative to the connector.

13. The connector of claim 12, wherein an inwardly facing surface of the housing includes an engagement surface configured to urge the biasing element inwardly to reduce the diameter dimension of the compliant ring to close the biasing element over sealing surface of the interface port.

14. The connector of claim 13, wherein the interface port includes a radially projecting surface at a tip end of the interface port;

wherein the sealing surface is disposed axially inboard of the tip end; and wherein the biasing element is disposed over the radially projecting surface to engage the sealing surface of the interface port.

15. The connector of claim 14, wherein the annular cavity is disposed between the inwardly and outwardly facing sealing surfaces of the compliant ring; and wherein the biasing element includes a plurality of spring-fingers having one end engaging the annular cavity of the compliant ring to expand the diameter dimension over a sealing surface of the interface port.

16. The connector of claim 11, wherein the at least one circumferential groove formed in an outwardly facing peripheral surface of the connector body; and wherein the housing includes at least one radially projecting protrusion slideably engaging the outwardly facing peripheral surface and engaging the circumferential groove to maintain a position of the housing relative to the connector body.

17. The connector of claim 16, wherein the housing includes at least one radially projecting tab disposed oppositely the at least one radially projecting protrusion; and wherein the radially projecting tab is pulled radially outboard to release the radially projecting protrusion from the at least one circumferential groove.

18. The connector of claim 17, wherein each spring-finger includes an inwardly projecting flange for engaging an outwardly projecting annular protrusion formed in the interface port to secure the connector body to the interface port.

* * * * *